3,413,638
ELECTRICAL PHASE-LOCKING CIRCUITS
Richard Morris Trim, Harlow, Essex, England, assignor to A. C. Cossor Limited, Harlow, England
Filed Dec. 16, 1965, Ser. No. 514,303
Claims priority, application Great Britain, Dec. 24, 1964, 52,438/64
9 Claims. (Cl. 343—108)

ABSTRACT OF THE DISCLOSURE

A circuit for locking the phase of two oscillations of different frequencies together is described, in which pulses are derived from parts of the two waveforms such that when the oscillations are out of phase the pulses are coincident. A coincidence detector is provided to correct the phase of one oscillation when coincident occurs. A remotely controlled radio-frequency source for testing the I.L.S. receivers of aircraft is also described which uses the phase-locking circuit. This abstract is neither intended to define the invention of the application which, of course, is to be measured by the claims, nor is it intended to be limiting as to the scope of the invention in any way.

---

Figure 1:
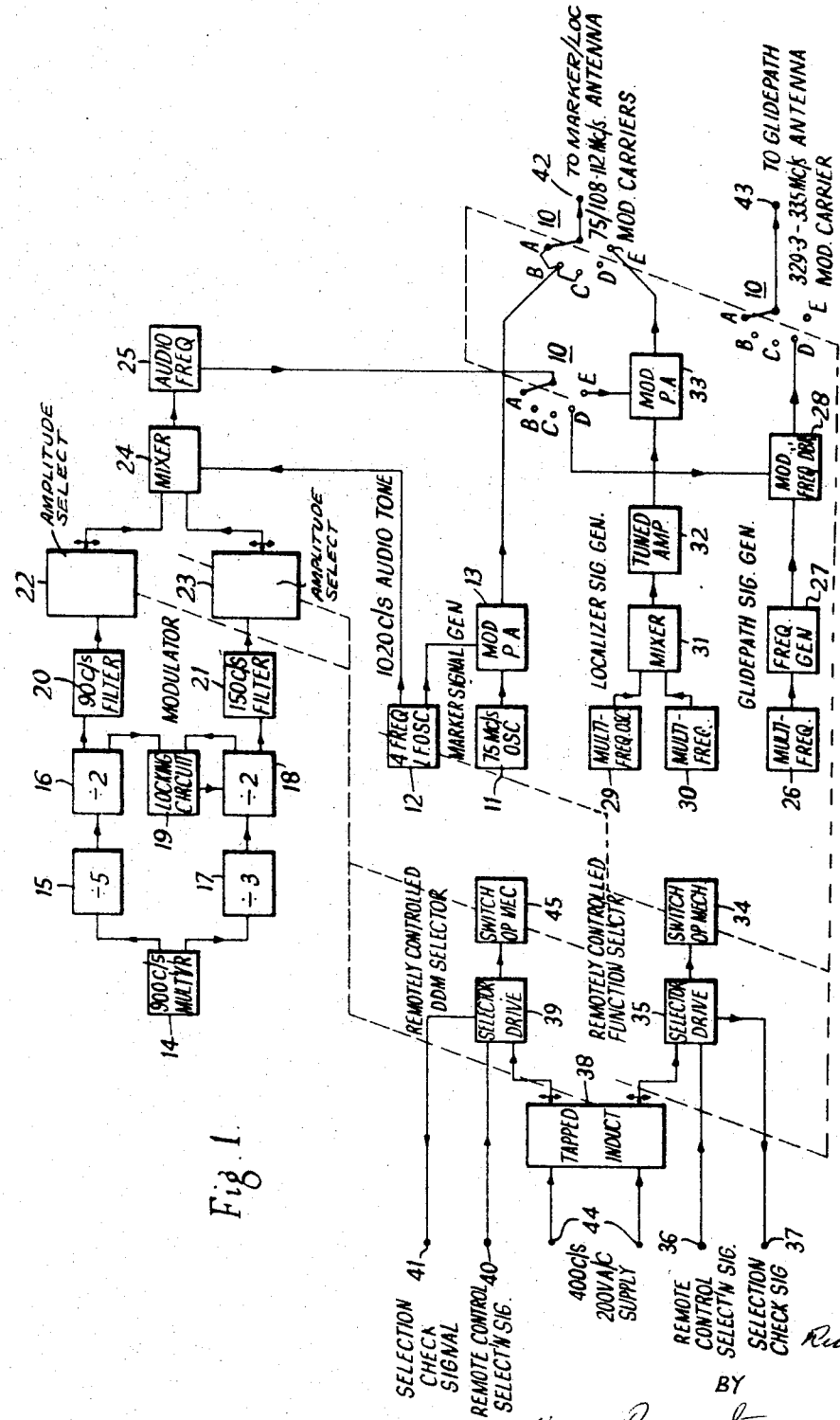

The present invention relates to phase-locking circuits, particularly but not exclusively for testing the receivers used in instrument landing systems for aircraft.

Such systems employ transmitters to direct four highly directional radio beams above and below, and to the right and left of the path which an aircraft should take on approach to an airport.

The high and low beams are used to correct the glide path of the aircraft and the left and right beams, known as localiser beams, to correct its lateral position. Each pair of beams is transmitted at a radio frequency and the beams of each pair are separately modulated by audio signals at two different frequencies, in present practice 90 c./s. and 150 c./s. It is the relative depth of modulation (D.D.M.) of the carriers received at the aircraft which enables the position of the aircraft to be indicated. Visual indication is given in the aircraft to allow the crew to correct course. The waveforms of the 90 c./s. and 150 c./s. signals must be in a certain relationship to one another for the system to function correctly, and the invention is particularly concerned with providing test equipment for ensuring that this relationship is obtained in aircraft receivers.

Another feature of instrument landing systems is the provision of marker signals indicating the distance of an aircraft from a certain point.

The particular embodiment of the invention herein described is in the form of test equipment for testing reecivers used in aircraft comprising means for simulating the various signals which would be received by aircraft at any one of many positions.

When the two audio signals have the required relationship with one another they are said to be phase locked. In this specification phase locking means the locking together of two oscillations of the same or different frequencies in such a way that corresponding nodes of the two waveforms, that is all nodes at which the waveforms are changing in the same sense, are either coincident or spaced (in time) a whole number of periods apart at a frequency, called the lowest common multiple (L.C.M.) frequency, this frequency being the L.C.M. of the two frequencies.

Where the frequencies are the same, the L.C.M. frequency equals this frequency, and when the oscillations are phase locked they are in phase in the usual meaning of the term.

In order that the conditions for phase locking can be fulfilled, the waveforms must be changing in the same sense at all coincident nodes, that is after one coincident node both waveforms must each have passed an odd number of nodes by the time the next coincident node is just passed. (If both waveforms have passed an even number of nodes then the node considered is not the next coincident node.)

After one coincident node, the next coincident node occurs when the number ($p$) of periods elapsed at one frequency ($f_1$) equals another number ($q$) of periods elapsed at the other frequency ($f_2$ that is when $p/f_1 = q/f_2$ or $p/q = f_1/f_2$. The number of cycles of frequencies $f_1$ and $f_2$ which occur in this time is therefore the lowest whole numbers $p$ and $q$ respectively which will satisfy the above equations. In order to fulfill the conditions for phase locking both the numbers $p$ and $q$ must be odd. For example if the freqquencies are 3 c./s. and 1 c./s. the numbers are 3 and 1, and therefore the frequencies can be phase locked. With the frequencies 2 c./s. and 4 c./s., the numbers are 2 and 1, one of which is even, indicating that these frequencies cannot be phase locked.

According to the present invention there is provided a circuit arrangement for supplying oscillations phase locked in the way specified to other oscillations, comprising first means for providing first pulses when a predetermined part of each cycle of first oscillations occurs, a circuit, for providing second oscillations, coupled to second means for providing second pulses when a part of each cycle of the second oscillations occurs, which is separated by half a cycle from the part of the cycle corresponding to the predetermined part of the first oscillations, whereby when the first and second pulses are concident in time, the first and second oscillations are not phase locked, and a coincidence detector for supplying to the circuit providing the second oscillations when the first and second pulses are coincident, an output signal adapted to prolong a cycle of the second oscillations by the time required for the two oscillations to become phase locked.

The two oscillations may be in the form of square-wave pulses and the first and second means may then be differentiating circuits providing short pulses at the leading and trailing edges of the square pulses. The coincidence detector may be an "AND" gate requiring two voltages of given polarities for operation, the differentiating circuits being so connected as to provide pulses of these polarities when the waveform of the second oscillations is 180° from the phase at which the waveforms are phase locked, that is when the waveforms are spaced apart by an integral number of half periods. In this instance the output signal from the coincidence detector is required to extend one cycle of the second oscillations by half a cycle (180°).

The circuit providing the second oscillations may employ a bistable "divide-by-two" circuit as its output stage, and the "AND" gate may then pass a signal, through an amplifier if necessary, to cause one output condition of the bistable circuit to be prolonged.

The two oscillations which as phase locked may, as already indicated, be used in a radio frequency source for testing the receivers used in instrument landing systems for aircraft. Such a signal source may provide the glide path and localizer signals by modulating variable carrier frequencies with the two oscillations.

The radio frequency source may comprise a square-wave oscillator which supplies the two oscillations through two different divider chains whose output signals are phase locked together. The output signals may then be passed to two output selectors which select the relative amplitudes of the signals to modulate the glide-path or localiser carrier signals, the relative amplitudes of these signals controlling the depth of modulation (D.D.M.) of the carrier signals. The output selectors are controlled by a switch known as the D.D.M. switch. The R.F. oscillators which provide the carrier signals are multi-channel crystal controlled oscillators either of whose output signals is passed under the control of a switch, known as the function switch, to a mixer in which the locked signals modulate the carrier signal.

A further variable oscillator may be provided to simulate the marker signals, the oscillator frequency being controlled by the function switch.

According to another aspect of the present invention there is provided a remote control system to control a radio frequency source for use in testing instrument landing systems, the remote control system operating a switch controlling the depth of modulation of the signal provided by a frequency source, or the type of signal provided by the source and comprising, a remote control unit including a first auto-transformer having a plurality of tapping points any one of which can be connected through a first switch to a drive circuit in a radio frequency source controlled by the remote control unit, the source also including a second auto-transformer having corresponding tapping points to those of the first auto-transformer any one of which can be connected through a second selector switch to the drive circuit, the second selector switch being mechanically coupled to means to be controlled from the remote control unit and a stepping means for stepping the second switch to change in steps the tapping point which is connected to the drive circuit, the arrangement being such that, when the first and second auto-transformers are connected across an A.C. supply, if the first and second switches do not connect corresponding tapping points to the drive circuit a voltage appears at the input to the drive circuit and the second switch is stepped until corresponding tapping points of the two auto-transformers are connected to the drive circuit.

Both the function switch and the D.D.M. switch of a source may be controlled by such a system. In this instance there are two switches (the function-controlling and D.D.M.-controlling switches) separately connected to each of the auto-transformers, each of these switches in the remote control unit separately controlling the corresponding switch in the distant unit. Two drive circuits will also be required.

Each drive circuit may consist of a transformer and a bridge rectifier circuit operating a relay, the relays connecting stepping devices driving the switches (usually rotary switches) in the distant unit.

Figure 2:
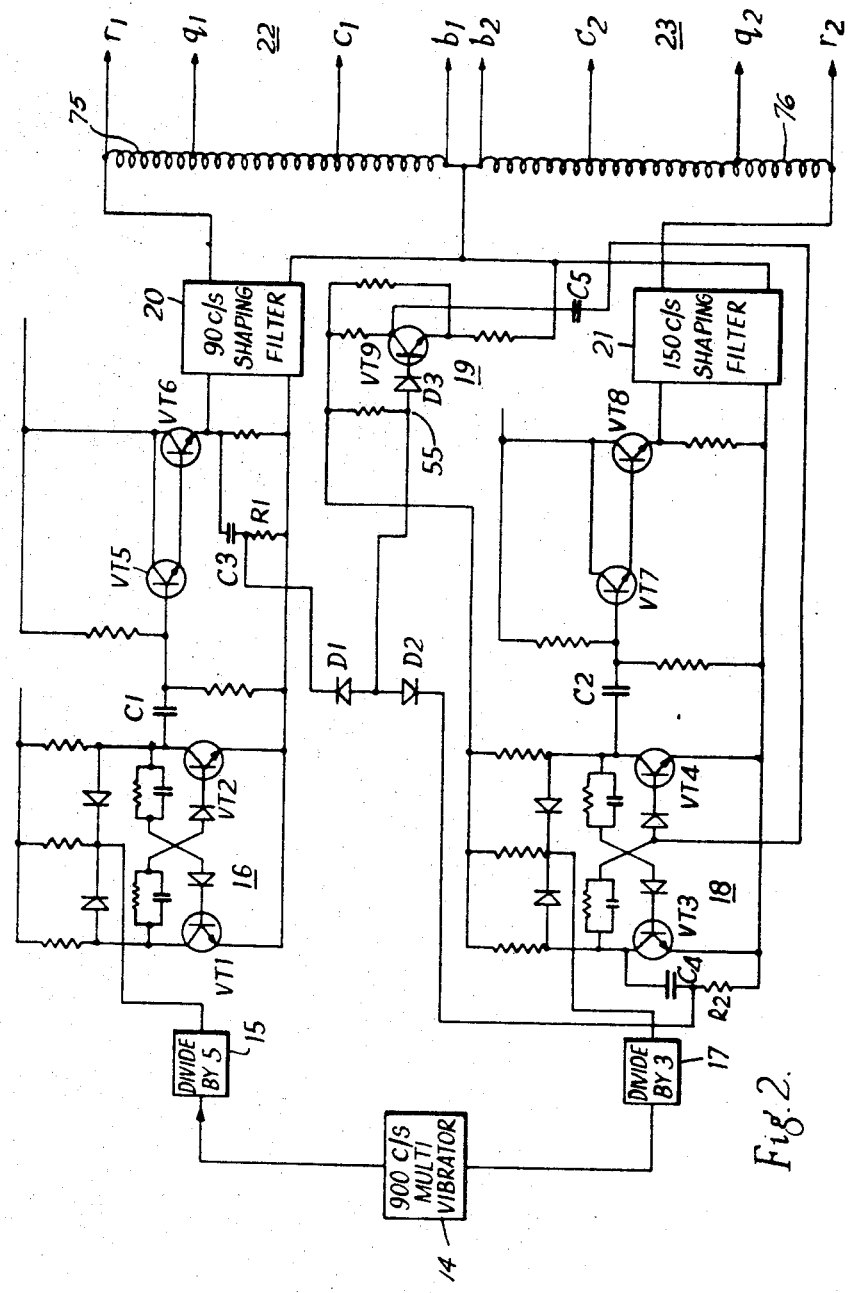
Figure 3:
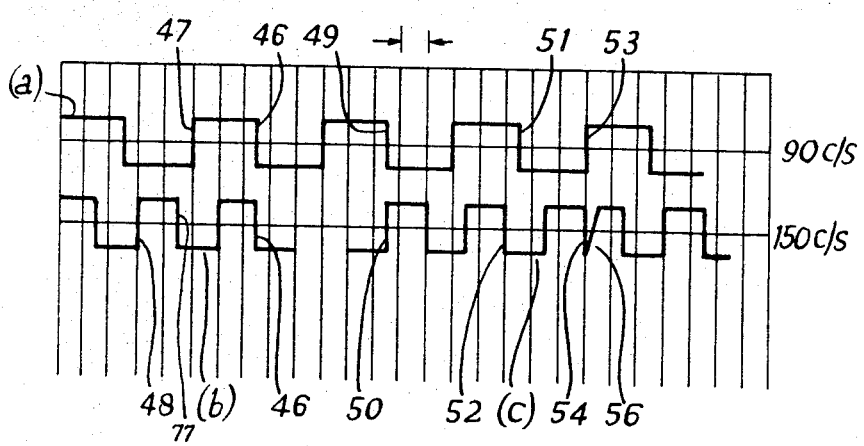
Figure 4:
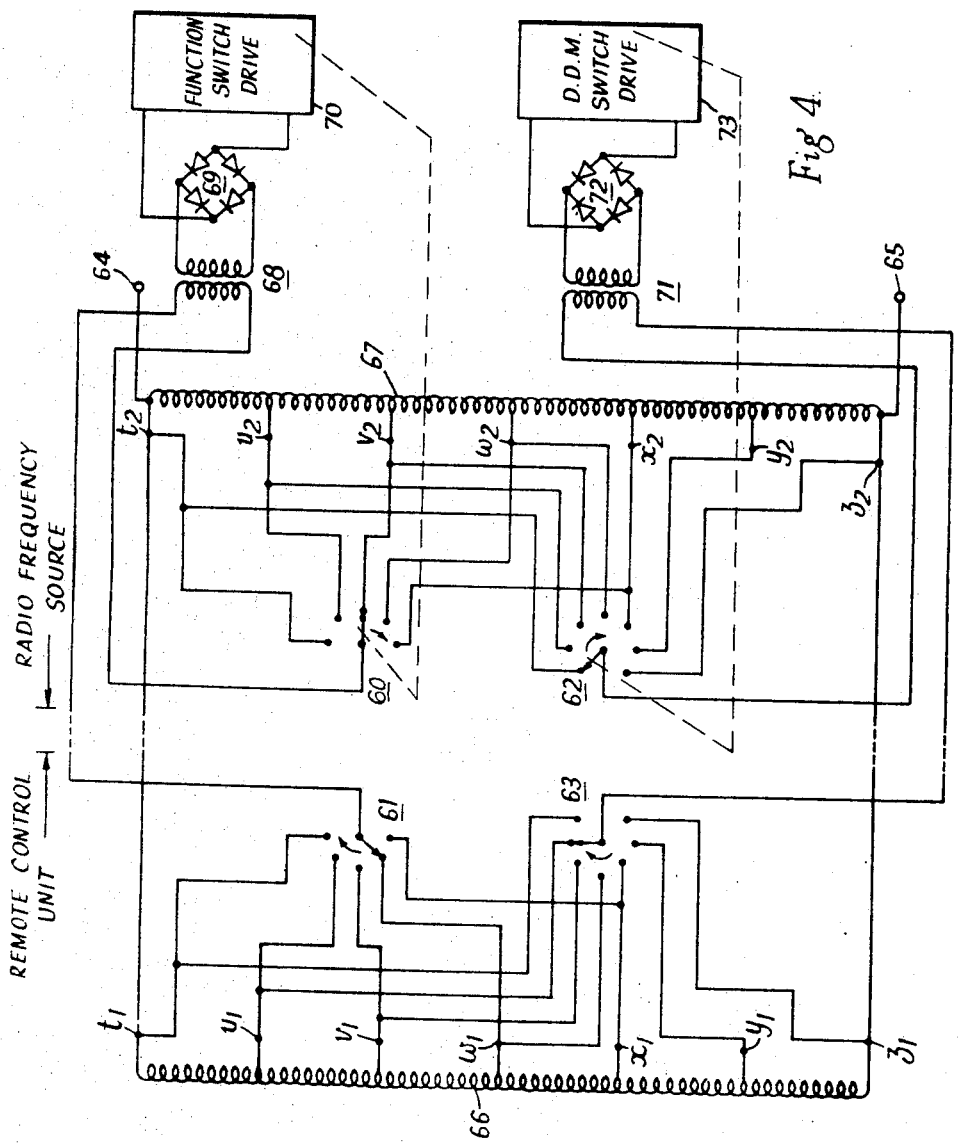

An embodiment of the invention will now be described with reference to the accompanying drawings, in which, FIG. 1 is a block circuit diagram of a radio frequency source incorporating both aspects of the invention, FIG. 2 is a circuit diagram of the part of the source of FIG. 1 which provides signals locked together, FIG. 3 illustrates what is meant by locking two oscillations together, and FIG. 4 is a circuit diagram of a remote control system for the source of FIG. 1.

A radio frequency source for use in testing aircraft receivers of instrument landing systems, which incorporates the invention will first be described in general with reference to the block diagram of FIG. 1.

The following signals are provided selectively at one of outlet terminals 42 and 43 by the source on rotation of a function switch 10 through its five positions A, B, C, D, and E: at positon A, a first marker signal (75 mc./s. modulated at 400 c./s.), at position B a second marker signal (75 mc./s. modulated at 1300 c./s.) at position C a third marker signal (75 mc./s. modulated at 3000 c./s.), at position D a variable glide-path carrier signal in one of 20 switch-controlled channels in the band 329.3–335.0 mc./s. modulated by variable 90 and 150 c./s. signals, and at position E a variable localiser carrier signal in one of 79 switch-controlled channels in the band 108.1–112.0 mc./s., modulated by a 1020 c./s. signal and by variable 90 and 150 c./s. signals.

The marker signals are provided by a 75 mc./s. oscillator 11, and a low frequency oscillator 12 controllable to provide any one of the four frequencies 400 c./s., 1300 c./s., 3000 c./s., 1020 c./s., the signals from the oscillators 11 and 12 being mixed in a modulating power amplifier 13.

The 90 and 150 c./s signals used to modulate the glide-path and localiser signals are produced by frequency division from a 900 c./s. multivibrator 14. A divided-by-five circuit 15 and a divided-by-two circuit 16 produce square pulses at a frequency of 90 c./s., and a divided-by-three circuit 17 followed by a divide-by-two circuit 18 provide square pulses 150 c./s.

These two pulse signals are phase locked together by a circuit 19 which will be described hereinafter in detail. The square pulses are formed into sinusoidal signals by band pass shaping filters 20 and 21 before passing to amplitude selectors 22 and 23 which allow the desired amplitude of each signal to be selected. A mixer that is adding circuit 24 mixes the two signals from the amplitude selectors 22, 23 and a 1020 c./s signal from the oscillator 12. The signal so formed is passed through an audio amplifier 25 to modulate the glide-path and localiser signals in a manner to be described later. The function of the 1020 c./s. tone is to allow a particular airport beacon to be identified. The ILS receiver in an aircraft is tuned to the frequency of the beacon and the 1020 c./s. tone is keyed to provide an identification signal, which is usually two letters in Morse code.

The glide-path signal is provided by an R.F., variable, crystal-controlled oscillator 26, a frequency-doubling circuit 27, and a modulating frequency-doubler and power amplifying circuit 28, the R.F. signal being modulated in the circuit 28 with the signal from the amplifier 25.

The localiser signal is provided by two R.F., variable crystal-controlled oscillators 29 and 30 supplying a mixer 31. The signal so produced passes through a tuned amplifier 32 before being modulated by the signal from the amplifier 25 in a modulating power amplifier 33. The localiser signal may be in any one of 79 channels in the band 108.1–112.0 mc./s.

A switch, known as the "manual-auto" switch (not shown), may be provided which when in the manual position allows the function and D.D.M. switches to be controlled by manual operation but which when in the auto positions allows these switches to be controlled by a remote control unit.

A switch operating mechanism 34 can be used to change the positions of the function switch 10 part of which controls the frequency of the oscillator 12, when auto operation is selected.

In this instance a selector drive circuit 35 controls the operating mechanism 34 in response to a signal from a remote control unit (not shown) which can be connected at a terminal 36, a signal passed from the selector drive circuit through the terminal 37 to the remote control point shows that selection has been correctly carried out. A voltage from part of a tapped selector inductor 38 indicates the position of the function switch when a 400 c./s. 200 v. supply is connected to terminals 44. The inductor 38 then supplies a signal to the selector drive circuit 35, which then moves the function switch accordingly.

The two amplitude selectors 22 and 23 which are coupled together to form a D.D.M. switch may be controlled in the same way as the function switch 10, by a switch operating mechanism 45 and a drive circuit 39, receiving signals from a terminal 40 when connected to a remote control unit.

The various wafers of the switch 10 and the switch controlling the four-frequency marker oscillator 12 are ganged together and they are also ganged to the switch operating mechanism 34 and the part of the inductor 38 which controls the mechanism 34 when the remote control unit is used.

The output selectors 22 and 23 are ganged together and are also ganged to the switch operating mechanism 45 and part of the inductor 38.

The circuit which provides the locked 90 and 150 c./s. waveforms will now be described in more detail with reference to FIG. 2.

The 900 c./s. oscillator 14 is a conventional astable multivibrator whose output frequency can be controlled to a certain extent by adjusting the resistance in the charging circuits of the cross-coupled capacitors (not shown). Both the divide-by-five and the divide-by-three circuits 15 and 17 are monostable multivibrators which on receiving a negative-going pulse from the 900 c./s. multivibrator 14 pass to their unstable condition and remain in that condition for the next four 900 c./s. pulses (in the case of the divide-by-five circuit) or the next two 900 c./s. pulses (in the case of the divide-by-three circuit), so dividing by 5 and 3 respectively.

The divide-by-two circuits 16 and 18, shown in more detail in FIG. 2 are indentical bistable multivibrators using the transistors VT1, VT2, VT3 and VT4. Their 90 c./s. and 150 c./s. outputs are taken through capacitors C1 and C2 to compound emitter-follower circuits comprising transistors VT5, VT6, VT7 and VT8.

The phase-locking circuit 19 depends for its action on the coincidence of a positive-going step in the 90 c./s. square-waveform at the emitter of the transistor VT6 with a negative-going step in the 150 c./s. square-waveform at the emitter of the transistor VT8. At this time the collector of the transistor VT3 is also going positive since a negative step at the emitter of VT8 is produced by a negative step at the emitter of VT4 which occurs when the emitter of VT3 goes positive. The waveforms at the collector of VT3 and the emitter VT6 are in step but the waveforms at the emitter of VT8 and the emitter of VT6 are out of step by half a period at the lowest common multiple frequency of 450 c./s. The situation is shown in FIG. 3, the waveform $a$ (at the emitter of VT6) being at 90 c./s. and the figure being divided up by parallel lines spaced apart by one period at 450 c./s. The waveform $b$ (at the emitter of VT8) is at 150 c./s. and is spaced an integral number of these periods from the 90 c./s. waveform; that is the waveforms are phase-locked, for example at points 46 both waveforms pass through nodes in the same direction and at points 47 and 48 corresponding nodes are spaced an intgeral number of L.C.M. periods apart. The waveform $c$ also at 150 c./s. is not phase locked to the 90 c./s. waveform in the way specified, since similar parts of the waveforms such as points 51 and 52 are not separated by an integral number of 450 c./s. periods.

In FIG. 2, the 90 c./s. output taken from the emitter of the transistor VT6 of the compound emitter-follower (VT5 and VT6) is differentiated by a capacitor C3 and a resistor R1, and the resulting short pulses are passed to an "AND" gate comprising diodes D1 and D2. The 150 c./s. output taken from the collector of the transistor VT3, and hence in a different sense for similar parts of cycles from the output taken at the emitter of the transistor VT6, is differentiated by a capacitor C4 and a resistor R2. The resulting short pulses are applied to the diode D2. When, as happens at points 53 and 54 (FIG. 3) of the unlocked waveforms $a$ and $c$, the 90 c./s. waveform is going positive and the 150 c./s. waveform is going negative, positive pulses back-bias the diodes D1 and D2 and a point 55 goes positive, switching on a transistor VT9 through a diode D3. A negative pulse therefore appears at the emitter of the transistor VT9, and is passed by way of a capacitor C5 to the base of the transistor VT4. Since the 150 c./s. waveform has just gone negative, the transistor VT4 has just been switched on; however the negative pulse from the transistor VT9 switches it off again and the 150 c./s. waveform returns positive as shown at 56 (FIG. 3), correcting the relative timing of the two waveforms as required. The "AND" gate (D1 and D2) does not operate at the points 49 and 50 because two negative pulses are then applied to the diodes D1 and D2.

The use of the two bistable multivibrators 16 and 18 in addition to the divide-by-five and-three circuits 15 and 17 allows the shaping filters to be band-pass, since the harmonic content of the 90 and 150 c./s. signals so produced is low. The two filters cut out the high frequencies in the square waveforms and change the pulses to sinusoidal signals.

To combine these sinusoidal signals the multi-tap auto-transformers 22 and 23 are used, their two windings being connected together at one end. Taps $b_1$ to $r_1$ on the transformers 22, and taps $b_2$ to $r_2$ on the transformer 23 are taken to switches (not shown) allowing any portion of either of the transformers to be used in combining the 90 and 150 c./s. signals and so allowing the relative amplitudes of the two signals to be set as desired, any one condition corresponding to the signal received in an aircraft at a certain position. The depth of modulation i.e. the D.D.M. of the two signals applied to the carrier signal can therefore be set by the switches connected to the auto-transformers and these switches are ganged together and collectively known as the D.D.M. switch.

The auto-transformers 22 and 23 are preferred to resistive potential dividers for their better accuracy and because they provide a low impedance for the modulation mixer 24 which uses transistor circuits.

The action of the remote control unit in setting the frequency source will now be described in more detail with reference to FIG. 4, where the remote control unit is shown to the left and the radio frequency source to the right of the figure.

It is required to set a part 60 of the function of switch 10 in FIG. 1 by setting a switch 61 in the remote control unit. Similarly a part 62 of the D.D.M. switch the switch connected to the auto-transformers 22 and 23 in FIG. 2, is to be controlled by setting the switch 63 in the remote control unit.

An A.C. signal is applied between terminals 64 and 65 and thus across two auto-transformers 66 and 67. These auto-transformers have a number of tapping points $t_1$ to $z_1$ and $t_2$ to $z_2$ which correspond to one another. The remote-control function switch 61 has five fixed contacts separately connected to the tappings $t_1$, $u_1$, $v_1$, $w_1$ and $x_1$, and in the same way the function switch 62 is connected to the tappings $t_2$ to $x_2$. The wipers of these switches are connected to a transformer 68, whose secondary feeds a bridge rectifier 69. When the wiper of the switch 61 connects a contact which does not correspond to the contact connected by the wiper of the switch 60, an alternating voltage will exist between the wipers. This voltage is rectified and passed to a drive unit 70 for the function switch, which rotates the wiper of the switch 60 until its position corresponds with that of wiper of the switch 61, when the alternating voltage disappears.

The remote-control D.D.M. switch 63 controls the D.D.M. switch 62 in the same way by producing a voltage which is applied through a transformer 71, a bridge rectifier 72 to a D.D.M. switch drive unit 73. The switches 62 and 63 are shown connected to all the taps $t_1$ to $z_1$ and $t_2$ to $z_2$ but the actual number of taps and switch connections depends on the number of different connections required between the auto-transformers 22 and 23 (FIG. 2) and the mixer 24 (FIG. 1). In practice since different steps of D.D.M. are required for simulating the glide path and localiser conditions, a switch ganged to the function switch will select a pair of switches from four switches connected to the auto-transformers 22 and 23 for the glide-path condition, and the other pair of switches for the localiser condition. Thus the number of taps on the auto-transformers 66 and 67 will be about half the number on the auto-transformers 22 and 23.

What is claimed is:

1. A circuit arrangement providing first and second oscillations of first and second different frequencies respectively, but phase locked together in the manner specified comprising, in combination:
   a source of third oscillations of a third frequency;
   first and second frequency divider means for effecting division by different numbers and both responsive to the third oscillations to provide the first and second oscillations respectively;
   comparison means for detecting coincidence between a predetermined point in a cycle of said first oscillation and a predetermined point in a cycle of said second oscillation;
   and means responsive to the comparison means detecting such coincidence to shift the phase of one of the first and second oscillations by half a cycle of the said one oscillation.

2. A circuit arrangement according to claim 1, wherein the first and second oscillations are square waves and said comparison means detect coincidence between edges of said first oscillation having a particular sense and edges of said second oscillation having a particular sense.

3. A circuit arrangement according to claim 1, wherein said comparison means comprise first and second differentiating means for differentiating said first and second oscillations respectively to produce trains of first and second pulses respectively at the edges of the oscillations, and coincidence gate means for detecting coincidence between a first pulse of a particular polarity and a second pulse of a particular polarity.

4. A circuit arrangement according to claim 1, wherein at least one of said first and second frequency divider means includes a plurality of cascaded divider circuits, including a final divide-by-two circuit and the said means which shift the phase of one of the oscillations are arranged to do so by applying a signal to the said divide-by-two circuit of one frequency divider circuit to cause an additional change of state of said divide-by-two circuit.

5. A radio-frequency source for testing receivers used in aircraft for instrument landing systems comprising, in combination:
   a circuit arrangement providing first and second oscillations of first and second different frequencies respectively but phase locked together in the manner specified, said circuit arrangement including:
   a source of third oscillations of a third frequency;
   first and second frequency divider means for effecting division by different numbers and both responsive to said third oscillations to provide said first and second oscillations respectively;
   comparison means for detecting coincidence between a predetermined point in a cycle of said first oscillation and a predetermined point in a cycle of said second oscillation;
   means responsive to said comparison means detecting such coincidence to shift the phase of one of said first and second oscillations by half a cycle of the said one oscillation;
   combining means for adding said first and second oscillations;
   glide-path oscillator means for providing a radio-frequency glide-path signal;
   localizer oscillator means for providing a radio-frequency localizer signal;
   selector means coupled to said glide-path and localizer oscillator means for selecting either said glide-path signal or localizer signal; and
   modulator means coupled to the said circuit arrangement and selector means to modulate the selected glide-path or localizer signal with a signal from said combining means.

6. A radio-frequency source according to claim 5, including
   variable-amplitude selector means for individually controlling the amplitudes of said first and second oscillations before application to said combining means, thus to control the depth of modulation of the modulated selected glide path or localizer signal.

7. A radio-frequency source according to claim 6, further including:
   audio oscillator means coupled to said combining means for simulating an airport beacon identification signal by modulating the selected glide-path or localizer signal;
   a source of a plurality of radio-frequency signals for simulating various marker signals; and
   further selector means for selecting either the modulated glide-path signal, the modulated localizer signal, or one of the marker signals.

8. A radio-frequency source according to claim 6, further comprising:
   a remote control unit including a first auto-transformer having a plurality of tapping points, and first switch means connected to select one of said tapping points;
   said radio-frequency source including a second auto-transformer having a plurality of tapping points;
   second switch means connected to select one of said tapping points of said second auto-transformer, said second switch means being mechanically coupled to said variable-amplitude selector means;
   drive means for stepping said second switch means, the input to said drive means being connected through said first and second switch means to selected tapping points of said first and second auto-transformers;
   an A.C. supply connected across said first and second auto-transformers to provide a voltage for said drive means, the said voltage having a value other than zero when said first and second switch means are not selecting corresponding tapping points of said first and second auto-transformers, thereby to step said second swtich means until corresponding tapping points are connected to said drive means.

9. A radio-frequency source according to claim 8, further including:
   audio oscillator means coupled to said combining means for simulating an airport beacon identification signal by modulating the selected glide path or localizer signal;
   a source of a plurality of radio-frequency signals for simulating various marker signals;
   third switch means in the remote control unit to select one of said tapping points of said first auto-transformer;
   further selector means for selecting either the modulated glide-path signal, the modulated localizer signal or one of the marker signals;
   fourth switch means in the radio-frequency source, mechanically coupled to the said further selector means to select one of the tapping points of said second auto-transformer; and
   further drive means in the radio-frequency source for stepping said fourth switch means, the input to said further drive means being connected through said third and fourth switch means to selected tapping points of said first and second auto-transformers.

(References on following page)

References Cited

UNITED STATES PATENTS

| | | | |
|---|---|---|---|
| 3,302,202 | 1/1967 | Gouriet | 343—108 X |
| 2,414,791 | 1/1947 | Barrow | 343—107 |
| 2,471,075 | 5/1949 | Montrose-Oster | 318—20.810 |
| 3,080,514 | 3/1963 | Foss et al. | 318—20.810 |
| 3,199,035 | 8/1965 | Kok et al. | 307—88.5 |
| 3,204,197 | 8/1965 | Marzan | 331—55 |

RODNEY D. BENNETT, *Primary Examiner.*

H. C. WAMSLEY, *Assistant Examiner.*